US012334647B2

(12) United States Patent
Brockett et al.

(10) Patent No.: US 12,334,647 B2
(45) Date of Patent: Jun. 17, 2025

(54) N-BIT REFLECTARRAY UNIT CELL COMPRISING SWITCHES FOR CONFIGURING DIPOLE RESONANT STRUCTURES

(71) Applicant: HRL Laboratories, LLC, Malibu, CA (US)

(72) Inventors: Timothy J. Brockett, Malibu, CA (US); Hanseung Lee, Newbury Park, CA (US); Ryan G. Quarfoth, Woodland Hills, CA (US); Hyok J. Song, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 244 days.

(21) Appl. No.: 18/304,204

(22) Filed: Apr. 20, 2023

(65) Prior Publication Data

US 2024/0356216 A1 Oct. 24, 2024

(51) Int. Cl.

*H01Q 3/46* (2006.01)
*H01Q 1/48* (2006.01)
*H01Q 1/50* (2006.01)
*H01Q 9/16* (2006.01)
*H01Q 21/06* (2006.01)

(52) U.S. Cl.

CPC ................. *H01Q 3/46* (2013.01); *H01Q 1/48* (2013.01); *H01Q 1/50* (2013.01); *H01Q 9/16* (2013.01); *H01Q 21/06* (2013.01)

(58) Field of Classification Search

CPC .. H01Q 3/46; H01Q 1/48; H01Q 1/50; H01Q 9/16; H01Q 21/06; H01Q 21/28; H01Q 15/148

See application file for complete search history.

(56) References Cited

U.S. PATENT DOCUMENTS

| | | | | |
|---|---|---|---|---|
| 6,020,853 | A | 2/2000 | Richards et al. | |
| 11,239,555 | B2 * | 2/2022 | Behdad | H01Q 3/46 |
| 11,862,870 | B1 * | 1/2024 | Kaddour | H01Q 3/46 |
| 2023/0216191 | A1 * | 7/2023 | Kalateh | H01Q 3/36 342/372 |

OTHER PUBLICATIONS

N. M. Monroe et al.; "Electronic THz Pencil Beam Forming and 2D Steering for High Angular-Resolution Operation: A 98×98-Unit 265GHz CMOS Reflectarray with In-Unit Digital Beam Shaping and Squint Correction", ISSCC, Feb. 2022; pp. 84-86.

(Continued)

*Primary Examiner* — Seung H Lee

(74) *Attorney, Agent, or Firm* — Wheatstone IP Law Corporation; Milad G. Shara

(57) ABSTRACT

An N-bit reflectarray unit cell is disclosed comprising a first part of a first dipole and a second part of the first dipole, and a first switch for connecting and disconnecting the first part of the first dipole to and from the second part of the first dipole. The unit cell further comprises a first part of a second dipole and a second part of the second dipole, and a second switch for connecting and disconnecting the first part of the second dipole to and from the second part of the second dipole.

25 Claims, 5 Drawing Sheets

(56) References Cited

OTHER PUBLICATIONS

Q. Zhang et al.; "A Low-Profile Beam-Steering Reflectarray With Integrated Leaky-Wave Feed and 2-Bit Phase Resolution for Ka-Band SatCom", IEEE Transactions on Antennas and Propagation, vol. 70, No. 3, Mar. 2022; pp. 1884-1894.
A. V. Diebold et al.; "Reflectarray Design Using a Discrete Dipole Framework", submitted to IEEE for possible publicaiton, arXiv:2206.00095v2 [physics.app-ph], Nov. 29, 2022; pp. 1-12.
J. Tao et al.; "2-Bit LCP-based Terahertz Reflectarray Scanning up to 60°", 2021 International Conference on Microwave and Millimeter Wave Technology (ICMMT), IEEE, 2021; 3 pp.
J. Yang et al.; "A Novel Electronically Controlled Two-Dimensional Terahertz Beam-Scanning Reflectarray Antenna Based on Liquid Crystals", Frontiers in Physics, vol. 8, Article 576045, Oct. 6, 2020; pp. 1-7.
H. Luyen et al.; "2-Bit Phase Quantization Using Mixed Polarization-Rotation/Non-Polarization-Rotation Reflection Modes for Beam-Steerable Reflectarrays." IEEE Transactions on Antennas and Propagation, vol. 68, No. 12, Dec. 2020; pp. 7937-7946.
J. Yang et al.; "Reflective Liquid Crystal Terahertz Phase Shifter with Tuning Range of Over 360°", The Institution of Engineering and Technology, IET Microwave Antennas & Propagation, 2018, vol. 12, Issue 9, Feb. 27, 2018; pp. 1466-1469.
X. Yang et al.; "A Novel 2-Bit Reconfigurable Reflectarray Element for Both Linear and Circular Polarizations", AP-S, 2017; pp. 2083-2084.
B. D. Nguyen et al.; "Two-Bit Phase-Shifting Element for Reflectarray applications", 2015 IEEE Conference on Antenna Measurements & Applications (CAMA), IEEE, 2015; 3 pages.
X. Yang et al.; "Design of a 2-Bit Reconfigurable Reflectarray Element Using Two MEMS Switches", 2015 IEEE International Symposium on Antennas and Propagation & USNC/URSI National Radio Science Meeting; IEEE, 2015. pp. 2167-2168.
R. Pereira et al.; "Dual Linearly-Polarized Unit-Cells with Nearly 2-Bit Resolution for Reflectarray Applications in X-Band", IEEE Transactions on Antennas and Propagation, vol. 60, No. 12, 2012; pp. 6042-6048.
S. Mener et al.; "A CPSS-Based Reflectarray Cell with Reconfigurable Capabilities", 2012 6th European Conference on Antennas and Propagation (EUCAP), IEEE, 2011; p. 808-811.
M. Barba et al.; "Electronic Controllable Reflectarray Elements in X Band", Frequenz 61.9-10, 2007; p. 203-206.
J. O. McSpadden et al.; "Ka-Band Beam Steering Reflectarray Study", IEEE Antennas and Propagation Society International Symposium, 1999 Digest. Held in conjunction with: USNC/URSI National Radio Science Meeting (Cat. No. 99CH37010), vol. 3, IEEE, 1999; p. 1662-1665.

* cited by examiner

N-BIT REFLECTARRAY UNIT CELL COMPRISING SWITCHES FOR CONFIGURING DIPOLE RESONANT STRUCTURES

TECHNICAL FIELD

This specification relates to unit cells for electronically scanning reflectarrays.

BACKGROUND

Electronically scanning reflectarrays comprise a panel of electronically configurable unit cells each tuned to provide a target reflection phase, thereby tuning the reflection phases across the entire panel. In this manner, an electromagnetic wave may be steered for any suitable reason, such as electromagnetic transmission (e.g., satellite, aircraft, terrestrial), null scanning radar, medical imaging and diagnostics, etc., without needing to mechanically redirect an antenna. There are several design considerations with electronically configurable unit cells, such as achieving low cost, low power consumption, and low signal attenuation, while avoiding undesirable effects, such as grating lobes.

DETAILED DESCRIPTION

Figure 1A:
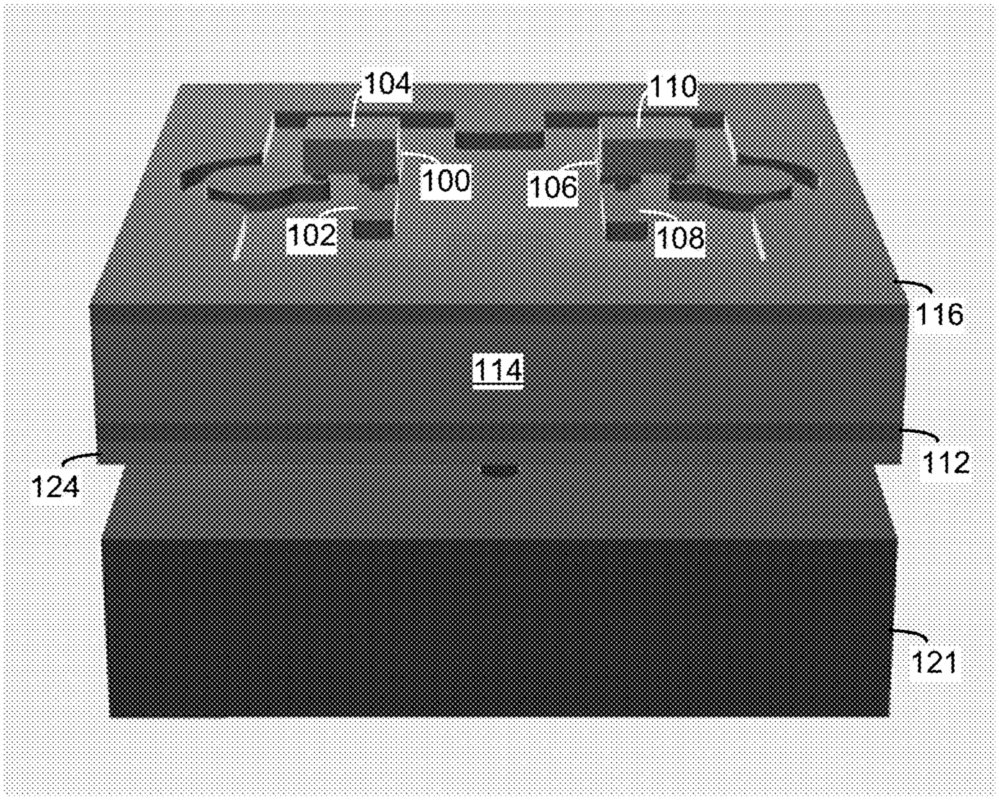
FIGS. 1A-1B show a perspective view of a N-bit reflectarray unit cell comprising first and second switches for connecting/disconnecting respective parts of a first and second resonant dipole structure, thereby electronically turning the reflection phase of the unit cell according to an embodiment.
Figure 1B:
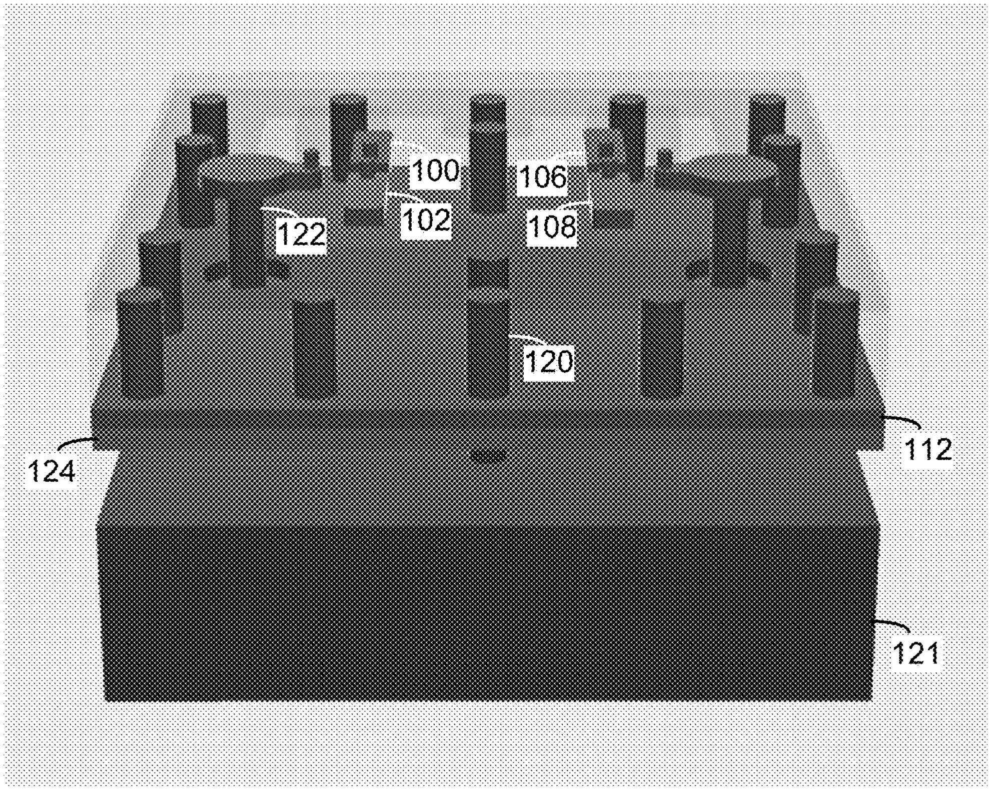

FIGS. 1A-1B show a perspective view for an embodiment of a N-bit reflectarray unit cell comprising a first part 100 of a first dipole and a second part 102 of the first dipole, and a first switch 104 for connecting and disconnecting the first part 100 of the first dipole to and from the second part 102 of the first dipole. The unit cell further comprises a first part 106 of a second dipole and a second part 108 of the second dipole, and a second switch 110 for connecting and disconnecting the first part 106 of the second dipole to and from the second part 108 of the second dipole. In this embodiment, the N-bit reflectarray unit cell comprises a bottom conductive ground plane 112, and an electrically insulating substrate 114 disposed on the bottom conductive ground plane 112, wherein the first dipole and the second dipole are disposed on the electrically insulating substrate 114. In FIG. 1B, the switches 104 and 110 as well as the electrically insulating substrate 114 are not shown for clarity.

Figure 1C:
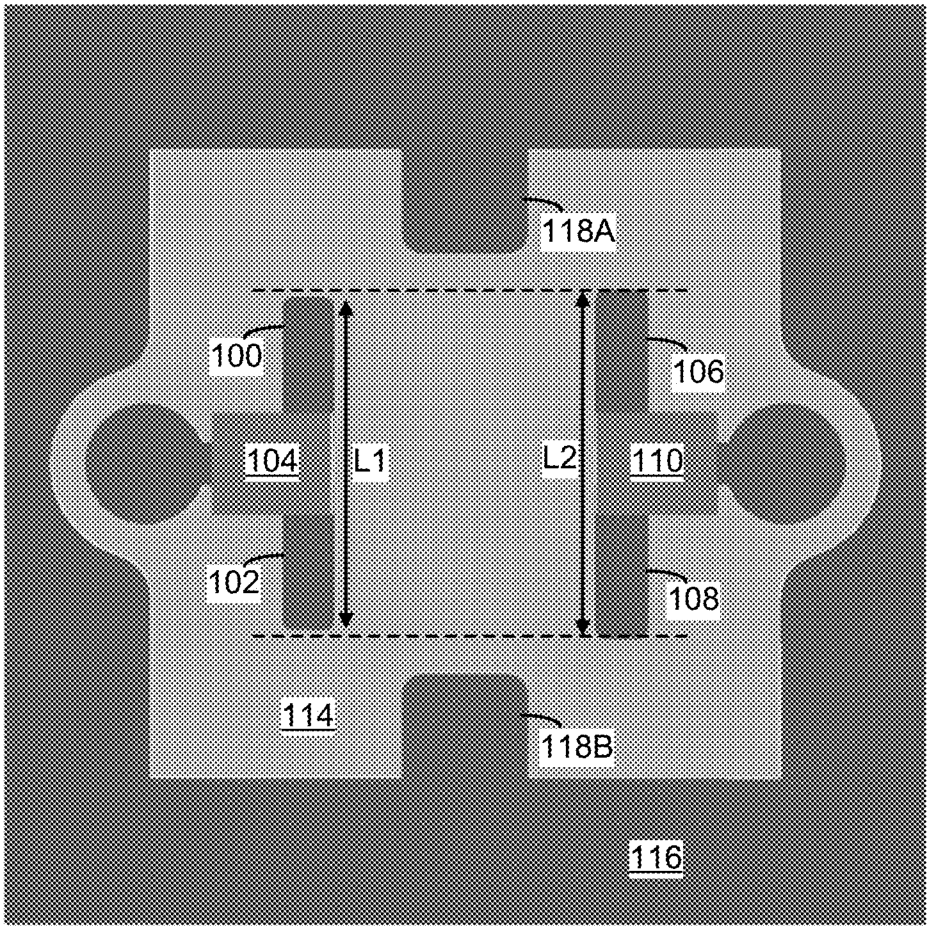
FIG. 1C shows a top view of the N-bit reflectarray unit cell shown in the embodiment of FIG. 1A.

Unit cells comprising a resonant structure (such as a dipole) resonate at a resonant frequency when illuminated with an incident electromagnetic wave at or near the resonant frequency. The resonating effect of the resonant structure causes the until cell to absorb and radiate the electromagnetic wave so as to reflect the wave at a phase related to the resonant frequency. Accordingly, configuring the resonant frequency of the resonant structure configures the reflection phase of the unit cell. In one embodiment, the resonant frequency of a resonant dipole structure is a function of the dipole dimensions (e.g., length and width). Referring to FIG. 1C which shows a top view of the unit cell of FIG. 1A, in one embodiment the length L1 of the first dipole is less than the length L2 of the second dipole so that each dipole resonates at a different resonant frequency. In one embodiment, controlling the switches 104 and 110 to connect the respective dipole parts causes the respective dipole to resonate, and disconnecting the respective dipole parts causes the respective dipole to stop resonating. In this manner the until cell may be configured into four states with four corresponding reflection phases (i.e., two switches can be configured into $2^2$ states). In one embodiment, the distance between each dipole may also affect the reflection phase of the unit cell, particularly in the state when both dipoles are resonating (both switches 104 and 110 are ON).

In the embodiment of FIGS. 1A-1C, the until cell comprises a top conductive frame 116 coupled to the bottom conductive ground plane 112 (e.g., through one or more vias such as via 120 shown in FIG. 1B) and substantially frames the first and second dipoles. In this embodiment, the top conductive frame 116 at least partially isolates the unit cell from neighboring unit cells. In one embodiment shown in FIG. 1C, the top conductive frame 116 comprises a first ridge 118A and a second ridge 118B which at least partially isolates the first dipole from the second dipole. In this embodiment since the top conductive frame 116 is coupled to the bottom conductive ground plane 112, the coupled structures may be considered a conductive ground plane.

Referring again to FIGS. 1A and 1B, in one embodiment each until cell is coupled to a suitable layer 121 having an application specific integrated circuit (ASIC) configured to control the switches 104 and 110 of each unit cell. For example as shown in FIG. 1B, each switch 104 and 110 may be coupled to the ASIC through a via (e.g., via 122 for controlling switch 104). Also in this embodiment, one or more of the vias for coupling the bottom conductive ground plane 112 to the top conductive frame 116 may also be coupled to the ground of the ASIC layer 121. In one embodiment, this vertical integration of the until cells with the ASIC control circuitry enhances scalability of the reflectarray panel.

In one embodiment, the dimensions of each unit cell (e.g., the sides of a rectangular or square until cell) are less than half the wavelength ($\lambda/2$) of the incident electromagnetic wave so as to reduce or avoid the undesirable effects of larger until cells, such as grating lobes. In other words, the operation and configuration of the until cells disclosed herein allows for the fabrication of sufficiently small structures that facilitate very high frequency operation, including mm-wave such as W-band and G-band. For example, in one embodiment the dimensions of the dipoles may have a length between 0.5 mm and 1.5 mm and a width between 0.08 mm to 0.2 mm which causes them to resonate in the W-band (75 GHZ-110 GHZ).

Referring again to FIGS. 1A and 1B, each until cell may be fabricated with any suitable electrically insulating layer 114, such as any suitable dielectric. In addition, the conductive ground plane (e.g., bottom conductive ground plane 112 and top conductive frame 116) as well as the first and second parts of the first and second dipoles may comprise any suitable conductive material, such as copper, silver, gold, or a combination thereof. Any suitable switch 104 and 106 may also be employed to connect/disconnect the parts of the dipoles, such as any suitable semiconductor type switch (e.g., a field effect transistor (FET) or PIN diode) or any suitable microelectromechanical system (MEMS) switch.

In the embodiment of FIG. 1A, the until cell comprises a residual photomask layer 124 used as part of the fabrication process; however, other embodiments may not utilize this photomask layer 124, or it may be removed from the final fabricated version of the unit cell. In addition, the ridges 118A and 118B of the conductive top frame 116 are an optional feature which may not be utilized in other embodiments of the unit cell.

Figure 2A:
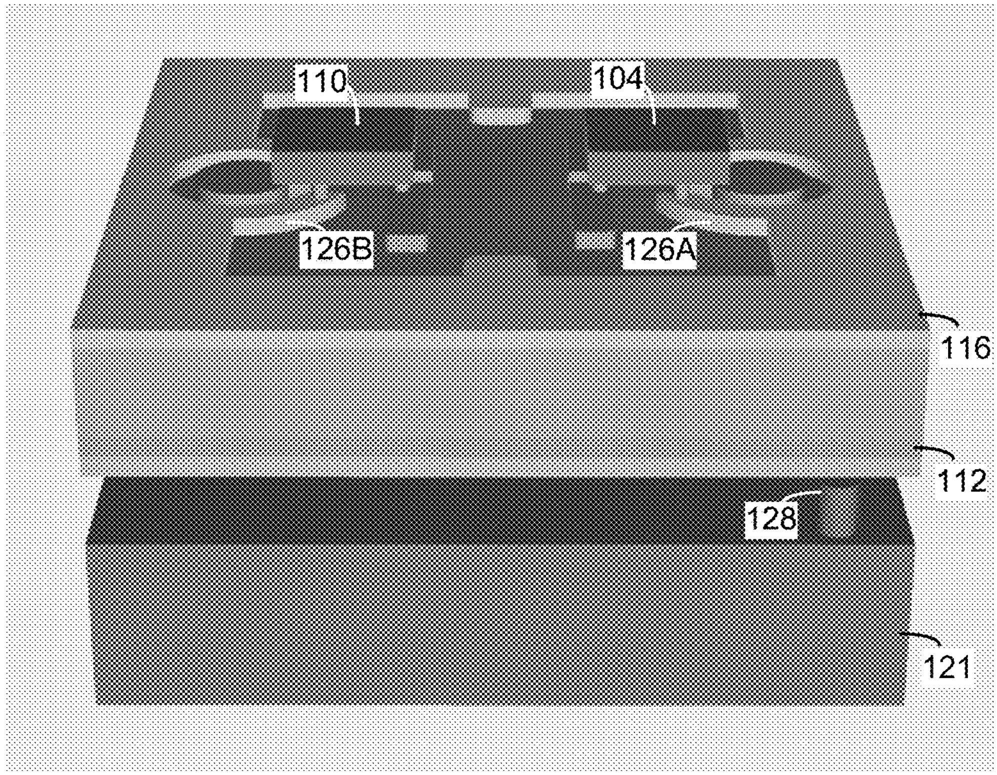
FIGS. 2A-2B show a perspective view of a N-bit reflectarray unit cell wherein a ground plane provides grounding for each switch according to an embodiment.
Figure 2B:
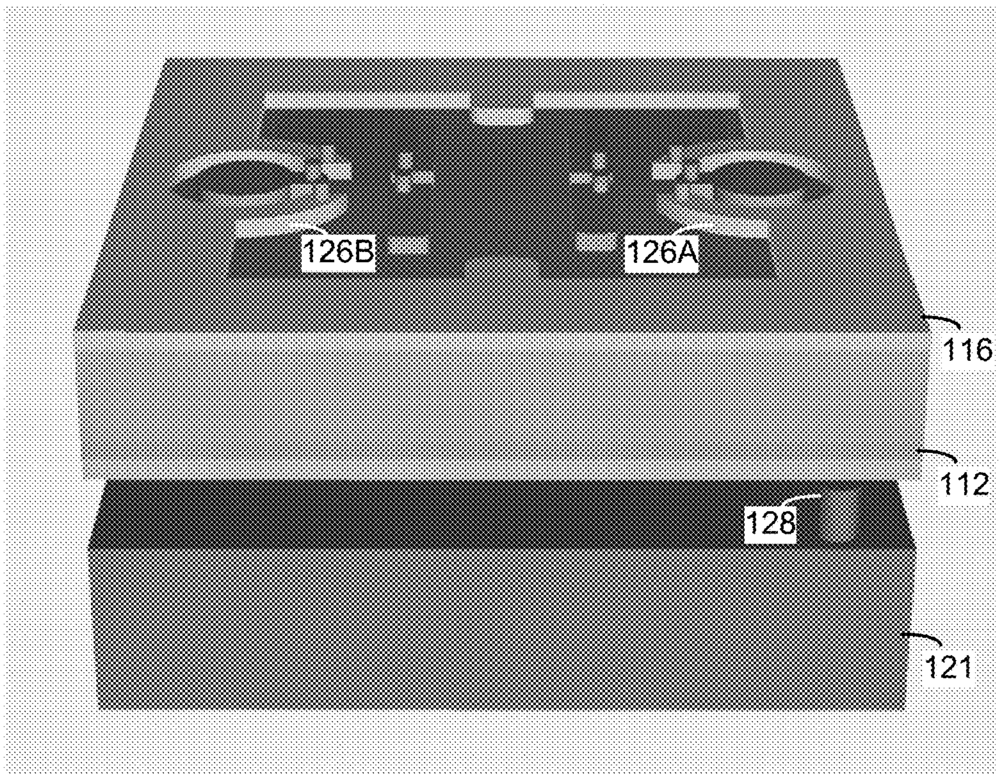
Figure 2C:
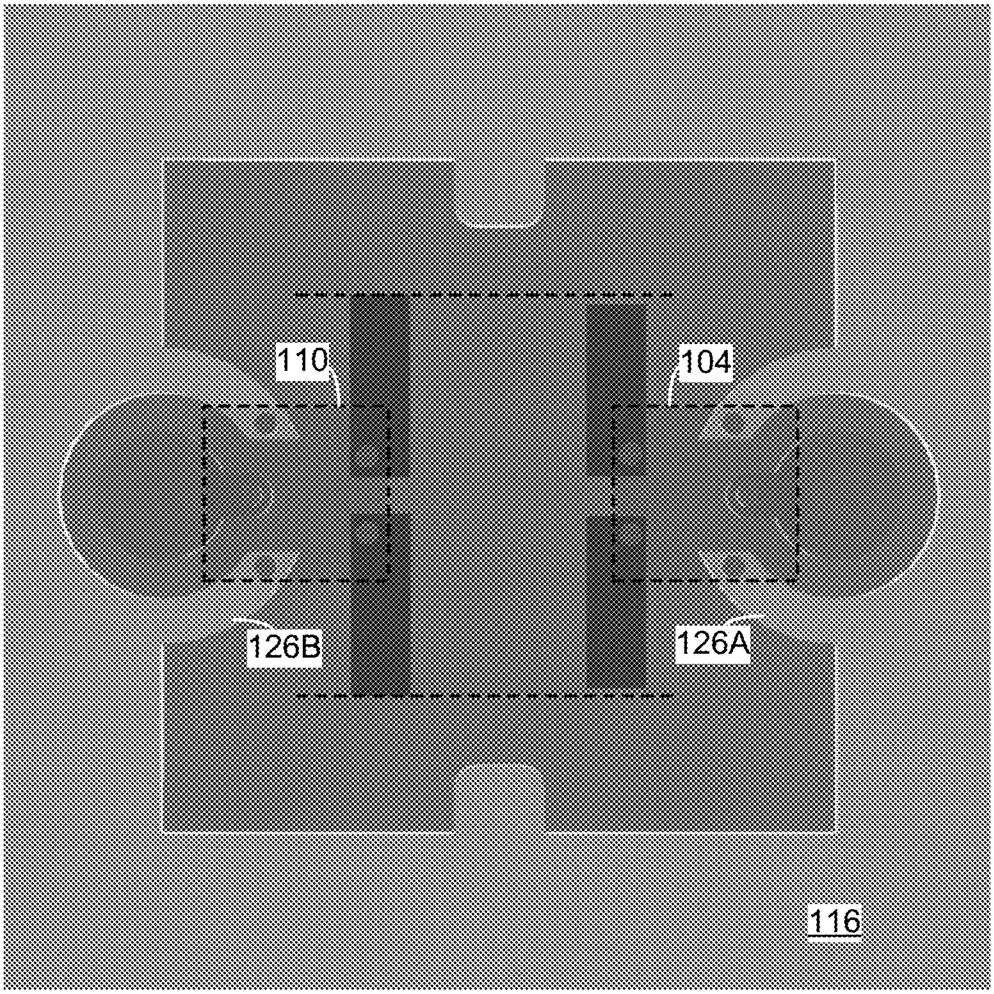
FIG. 2C shows a top view of the N-bit reflectarray unit cell shown in the embodiment of FIG. 2A.

In one embodiment, an isolated gate pad or other biasing structures can be added for extra functionality of the switches 104 and 106, if needed. In addition, in one embodiment the conductive ground plane 112 can be used to provide grounding to the switches 104 and 106, such as DC grounding to the source and drain of a FET switch, or to ground one side of a MEMS switch. An example of this embodiment is shown in FIGS. 2A-2C wherein the top conductive frame 116 comprises first and second ground rings 126A and 126B suitably coupled to the respective switches in order to provide the grounding. FIGS. 2A and 2B also show an embodiment wherein a solder ball 128 may be used to couple the conductive ground plane (e.g., bottom conductive ground plane 112) to the ground of the ASIC layer 121.

Figure 3:
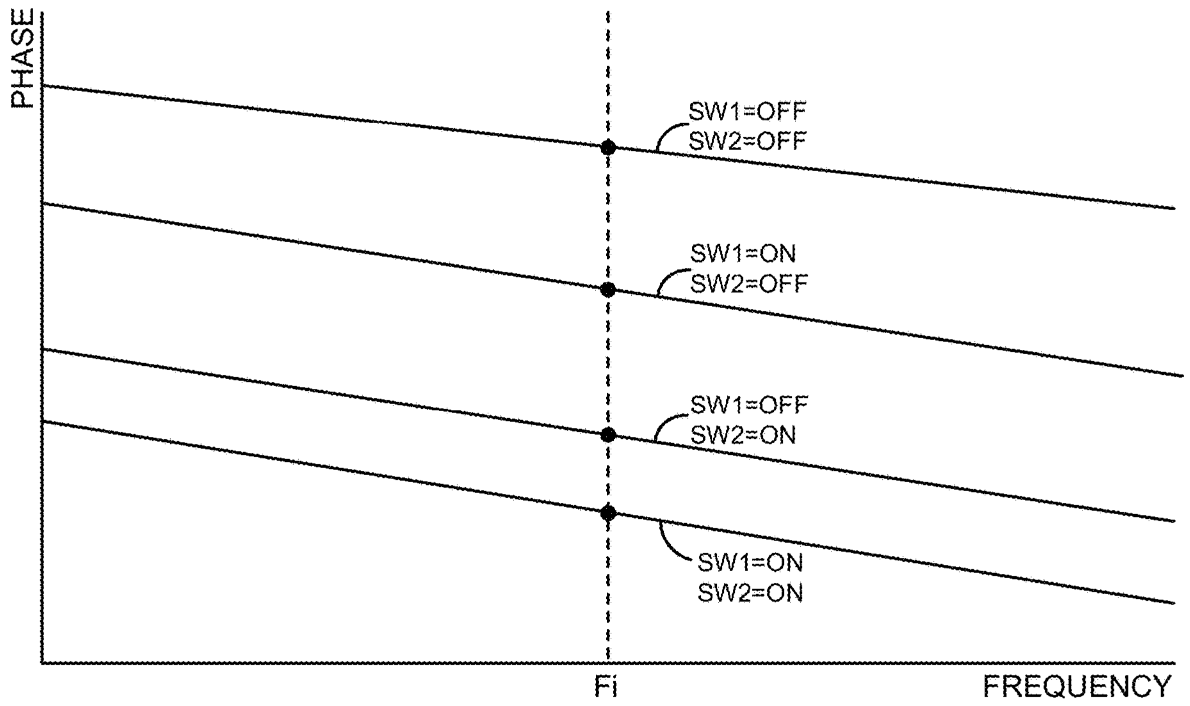
FIG. 3 shows an embodiment wherein a 2-bit reflectarray unit cell can be configured into four states resulting in four different reflection phases.

FIG. 3 shows an embodiment wherein a 2-bit reflectarray unit cell can be configured into four states resulting in four different reflection phases for a corresponding incident frequency (Fi) of the incident electromagnetic wave. That is, in an embodiment wherein the until cell comprises two switches for configuring two dipoles, the switches can be configured into four states corresponding to four different reflection phases. Other embodiments may employ more than two switches for configuring more than two dipole resonant structures, in which case each until cell may be configured into $2^N$ states (where N equals the number of switches and dipoles).

In one embodiment, the reflection phases corresponding to each of the $2^N$ states are separated by approximately 360/N degrees. For example, in the embodiment of FIG. 3 wherein there are $2^2=4$ states, the reflection phases are separated by approximately 360/4=90 degrees. In this manner, the resolution and range of the configurable reflection phases is spread approximately evenly over the 360 degree spectrum.

Although in the above described embodiments switches are used to configure (e.g., enable/disable) respective dipole resonant structures, in other embodiments the switches may be used to configure any suitable shape of resonant structures.

A number of example embodiments have been described. Nevertheless, it will be understood that various modifications may be made without departing from the spirit and scope of the devices and methods described herein.

What is claimed is:

1. A N-bit reflectarray unit cell comprising:

a first part of a first dipole and a second part of the first dipole;

a first switch for connecting and disconnecting the first part of the first dipole to and from the second part of the first dipole;

a first part of a second dipole and a second part of the second dipole; and a second switch for connecting and disconnecting the first part of the second dipole to and from the second part of the second dipole.

2. The N-bit reflectarray unit cell as recited in claim 1, wherein:

connecting the first part of the first dipole to the second part of the first dipole causes the first dipole to resonate at a first frequency when excited by an incident electromagnetic wave; and connecting the first part of the second dipole to the second part of the second dipole causes the second dipole to resonate at a second frequency when excited by the incident electromagnetic wave.

3. The N-bit reflectarray unit cell as recited in claim 2, wherein the first frequency is different from the second frequency.

4. The N-bit reflectarray unit cell as recited in claim 3, wherein:

the first dipole has a first length related to the first frequency;

the second dipole has a second length related to the second frequency; and the first length is different from the second length.

5. The N-bit reflectarray unit cell as recited in claim 2, wherein:

disconnecting the first part of the first dipole from the second part of the first dipole causes the first dipole to stop resonating; and disconnecting the first part of the second dipole from the second part of the second dipole causes the second dipole to stop resonating.

6. The N-bit reflectarray unit cell as recited in claim 1, further comprising a conductive ground plane connected to each switch for providing grounding for each switch.

7. The N-bit reflectarray unit cell as recited in claim 1, further comprising a conductive ground plane comprising a ridge configured to at least partial isolate the first dipole from the second dipole.

8. The N-bit reflectarray unit cell as recited in claim 1, wherein:

the N-bit reflectarray unit cell comprises N dipoles and N respective switches each for configuring a respective on of the N dipoles; and the N-bit reflectarray unit cell is configurable into $2^N$ states by configuring the N switches.

9. The N-bit reflectarray unit cell as recited in claim 8, wherein each state of the unit cell causes a corresponding phase shift when reflecting an incident electromagnetic wave.

10. The N-bit reflectarray unit cell as recited in claim 9, wherein the phase shifts are separated from one another by approximately 360/N degrees.

11. The N-bit reflectarray unit cell as recited in claim 1, further comprising:

a bottom conductive ground plane;

an electrically insulating substrate disposed on the bottom conductive ground plane, wherein the first and second dipoles are disposed on top of the electrically insulating substrate; and a top conductive frame coupled to the bottom conductive ground plane and substantially framing the first and second dipoles for at least partially isolating the N-bit reflectarray unit cell from neighboring N-bit reflectarray unit cells.

12. A N-bit reflectarray unit cell comprising:

a bottom conductive ground plane;

an electrically insulating substrate disposed on the bottom conductive ground plane, a first dipole and a second dipole disposed on top of the electrically insulating substrate; and a top conductive frame coupled to the bottom conductive ground plane and substantially framing the first and second dipoles for at least partially isolating the N-bit reflectarray unit cell from neighboring N-bit reflectarray unit cells.

13. The N-bit reflectarray unit cell as recited in claim 12, wherein:

the first dipole is substantially parallel to the second dipole; and the top conductive frame comprises a ridge for at least partially isolating the first dipole from the second dipole.

14. The N-bit reflectarray unit cell as recited in claim 12, further comprising:

a first switch for connecting and disconnecting a first part of the first dipole to and from a second part of the first dipole; and a second switch for connecting and disconnecting a first part of the second dipole to and from a second part of the second dipole.

15. The N-bit reflectarray unit cell as recited in claim 14, wherein:

connecting the first part of the first dipole to the second part of the first dipole causes the first dipole to resonate at a first frequency when excited by an incident electromagnetic wave; and connecting the first part of the second dipole to the second part of the second dipole causes the second dipole to resonate at a second frequency when excited by the incident electromagnetic wave.

16. The N-bit reflectarray unit cell as recited in claim 15, wherein the first frequency is different from the second frequency.

17. The N-bit reflectarray unit cell as recited in claim 16, wherein:

the first dipole has a first length related to the first frequency;

the second dipole has a second length related to the second frequency; and the first length is different from the second length.

18. The N-bit reflectarray unit cell as recited in claim 15, wherein:

disconnecting the first part of the first dipole from the second part of the first dipole causes the first dipole to stop resonating; and disconnecting the first part of the second dipole from the second part of the second dipole causes the second dipole to stop resonating.

19. The N-bit reflectarray unit cell as recited in claim 14, wherein the top conductive frame is connected to each switch for providing grounding for each switch.

20. The N-bit reflectarray unit cell as recited in claim 14, wherein:

the N-bit reflectarray unit cell comprises N dipoles and N respective switches each for configuring a respective one of the N dipoles; and the N-bit reflectarray unit cell is configurable into $2^N$ states by configuring the N switches.

21. The N-bit reflectarray unit cell as recited in claim 20, wherein each state of the unit cell causes a corresponding phase shift when reflecting an incident electromagnetic wave.

22. The N-bit reflectarray unit cell as recited in claim 21, wherein the phase shifts are separated from one another by approximately 360/N degrees.

23. A N-bit reflectarray unit cell comprising:

a bottom conductive ground plane;

an electrically insulating substrate disposed on the bottom conductive ground plane;

a first dipole and a second dipole disposed on top of the electrically insulating substrate;

a first switch for configuring the first dipole; and a second switch for configuring the second dipole, wherein the first switch and the second switch are connected to the bottom conductive ground plane to provide grounding for the first switch and the second switch.

24. The N-bit reflectarray unit cell as recited in claim 23, wherein:

the first switch for connecting and disconnecting a first part of the first dipole to and from a second part of the first dipole; and the second switch for connecting and disconnecting a first part of the second dipole to and from a second part of the second dipole.

25. The N-bit reflectarray unit cell as recited in claim 23, wherein:

the N-bit reflectarray unit cell comprises N dipoles and N respective switches each for configuring a respective one of the N dipoles;

the N-bit reflectarray unit cell is configurable into $2^N$ states by configuring the N switches;

each state of the unit cell causes a corresponding phase shift when reflecting an incident electromagnetic wave; and the phase shifts are separated from one another by approximately 360/N degrees.

* * * * *